March 5, 1957  L. S. GOLDMAN  2,784,146
GROWING AND IDENTIFICATION OF FUNGI
Filed Sept. 16, 1954

Leon S. Goldman
INVENTOR

Harold C. Herman
AGENT.

2,784,146
GROWING AND IDENTIFICATION OF FUNGI

Leon S. Goldman, Jamaica, N. Y.

Application September 16, 1954, Serial No. 456,475

11 Claims. (Cl. 195—100)

This invention is a continuation-in-part of my copending application Serial No. 425,490 filed on April 26, 1954, now abandoned, and relates to pathogenic fungus identifying equipment and more particularly to impregnated paper as a culture medium for the growing and identification of fungi.

Taking "athlete's-foot" as an example, there are four pathogenic fungi that account for all the mycotic infections of the foot. Each one of the four is treated in a different manner so that the identification thereof is a primary step in the treatment of the condition. The four fungi are *Monilia albicans, Trichophyton purpureum* or *T. rubrum, Trichophyton gypseum* or *T. mentagrophytes,* and *Epidermophyton inguinale* or *E. floccosum.*

Heretofore in the prior art, solidified agar media were utilized for pathogenic fungus identification. These media were allowed to solidify in a test tube which is positioned at a slant to provide for a surface area on the medium that is larger than the cross-section area of the tube. The most popular medium utilized is "Sabouraud Dextrose Agar" which includes 10 grams of peptone, 40 grams of dextrose, 15 grams of agar, and 1000 grams of water, and which, when solidified in the test tube, provides a "Sabouraud slant." The slant is inoculated with the exudate secured from the vesicles, if any, or with the scales of the skin lesion and kept at room temperature in the dark for a few weeks until a fungus colony develops that is sufficiently large and occasionally characteristically pigmented on the reverse side for identification purposes. Each of the four pathogenic fungi listed above provides a distinguishable colony on the surface of the slant. *T. purpureum,* for example, provides a white cottony colony, the reverse side of which varies from colorless to a pale yellow, eventually turning red to purple. *T. gypseum* appears also as a white cottony colony on the surface of the slant, the reverse side varying from a pale yellow to a tan color. The colors produced are observed by looking through the tube and the agar, since they develop on the under-surface of the slant in the agar. They are not readily perceptible from the upper surface of the slant. "Sabouraud Dextrose Agar" is sufficiently acidic in reaction to suppress the growth of most bacterial contaminants.

Utilizing the prior art slant, the colonies are slow-growing; two to three weeks, for example, are necessary for the identification, on the basis of pigment-production, of *T. purpureum.* The pigmentation, moreover, is not clearly defined and is difficult to identify at an early stage due to the fact that it is necessary to look through the agar to observe the pigment formed. It takes a long time for the pigment to diffuse away from the under-surface of the colony where it is formed and discolorations and impurities in the agar tend to further inhibit an early identification. In addition, proper storage is difficult as the agar shrinks, dries, and discolors as it ages. Finally, when the slant is inoculated, contaminants may enter and cause the growth of mold colonies on the surface of the slant. Many of the contaminant colonies, such as Penicillium and Aspergillus, develop more rapidly than the pathogenic organism and, due to the substantially smooth surface of the medium, quickly override or spread over the surface before the pathogenic colony develops. When an overriding contaminant occurs, the results of the inoculation are completely obscured.

The preparation of "Sabouraud Dextrose Agar," and for that matter any agar slant or petri plate, is time-consuming and requires the use of sterilization equipment such as an autoclave. For small laboratories and in the field this presents a problem to the technician which can only be solved by obtaining the prepared sterile slants elsewhere.

"Littman Oxgall Agar," which is a newer common nutrient agar for the cultivation and identification of fungus colonies, includes crystal violet and streptomycin to provide the antibiotic activity needed to arrest gram-positive and gram-negative bacterial growth, and oxgall to restrict the spreading of the fungus colonies, both pathogenic and contaminant. This culture medium has recently been modified to contain Actidione, another antibiotic, that will further suppress the growth of mold contaminants. If a nutrient agar is neutral in reaction, as is "Littman Oxgall Agar," it is necessary to incorporate antibiotics in order to suppress bacterial growth. The formula for "Littman Oxgall Agar" is 10 grams of peptone, 10 grams of dextrose, 20 grams of agar, 0.01 gram of crystal violet, 30 milligrams of streptomycin, and 1000 grams of water. With "Littman Oxgall Agar" the fungi grow even more slowly and the medium is unstable, lasting only one to two weeks under refrigeration, due to the presence of the antibiotics which are chemically unstable. The other difficulties described above in reference to the "Sabouraud" agar are also present in the "Littman Oxgall Agar" or with any other mycological culture medium that is utilized in the form of a slant or petri plate.

It is therefore an object of the present invention to provide a medium for the growth and identification of pathogenic fungi and yeast-like organisms that may infect the skin of the feet, the skin of the whole body, and the fungi that may invade the lungs, the blood stream, or any organ of the body.

Still another object of the present invention is the provision of a diagnostic culture medium that can be stored for longer periods of time, without shrinkage, discoloration, and deterioration.

Still another object of the present invention is the provision of a mycological culture medium that may be prepared in a sterile dehydrated form which can be indefinitely stored without refrigeration, and which requires only the addition of several cc. of sterile water to the contents for activation before using.

Still another object of the present invention is the provision of a medium for the identification of pathogenic fungi that localizes the growth of contaminants.

Still another object of the present invention is the avoidance of the use of solidifying culture media and the difficulties inherent therein for the growth and identification of fungi.

The present invention overcomes the difficulties presented by the prior art and accomplishes the foregoing objects by providing a vial which contains a white and a black strip of filter paper which are sewn together and saturated with a nutrient material. The black surface is inoculated with the exudate or scales of the skin lesion, or with the sputum or blood under consideration, and reveals, as soon as it forms, the fungus colony. The white paper reveals the characteristic pigments, liberated by many of the fungi, in their metabolic processes, with the aid of calcium carbonate placed between the papers to intensify the pigments to more readily identify the fungus.

It is, therefore, still another object of the present invention to provide a saturated paper diagnostic mycological culture medium.

Still another object of the present invention is the provision of a saturated paper mycological diagnostic culture medium having a black surface which readily reveals the distinct formation of a colony and a white surface which readily reveals the distinct color changes accompanying the colony growth.

Still another object of the present invention is the provision of a diagnostic culture medium which utilizes color-enhancing means for the pigments liberated during the formation of the colony.

Still another object of the present invention is the provision of a paper diagnostic mycological culture medium that localizes or restricts the growth of contaminants and provides for rapid growth of the colony.

Further objects and advantages will become apparent to those skilled in the art upon consideration of the drawings wherein.

Figure 1:
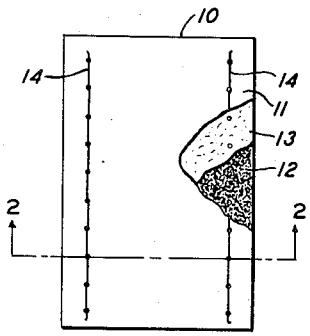
Fig. 1 is a top view of the paper diagnostic culture medium of the present invention.
Figure 2:
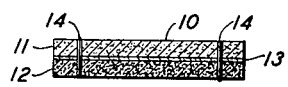
Fig. 2 is a sectional view along lines 2—2 of Fig. 1 of the paper diagnostic culture medium of the present invention.
Figure 3:
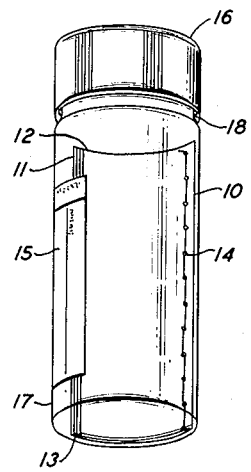
Fig. 3 is a pictorial view of the vial which contains the paper diagnostic culture medium of the present invention.

Referring to Figs. 1 through 3, medium 10 is a paper impregnated mycological culture medium which comprises two rectangular pieces of filter paper 11 and 12. The papers 11 and 12 are highly porous and chemically pure filter papers, with paper 12 having been dyed black with aniline black and washed with alcohol and water until the washings were free from dye. In the preferred embodiment of the present invention the papers are "Schleicher and Schuell No. 725" filter paper. The present invention is not however restricted to filter paper as any porous material such as cloth or cotton may be utilized. Sandwiched between the black paper 12 and the white paper 11 is a thin layer 13 of calcium carbonate, or precipitated chalk, which has been painted as a 10% suspension in water containing 0.5% gum arabic as an adhesive on the black paper 12 while the latter was still wet from the washing described above. The coated black paper 12 is then allowed to dry. An absolutely black body is unknown in nature, though assumed in some theoretical investigations in physics. Ordinarily black bodies reflect all the colors of the spectrum equally, but slightly, and hence are really of a very dark shade of gray. The name is colloquially given also to bodies that show selective absorption, as very dark greens, blues and browns. Similarly an absolutely white body is also unknown in nature. A white body is one which is light or relatively light in color.

In the manufacture of medium 10, large square sheets of filter paper are dyed black, washed, coated with the calcium carbonate suspension, and allowed to dry. A similar undyed sheet is placed on the coated black sheet in such a manner that the carbonate is sandwiched between the black and white papers. The two sheets are then stitched together on a sewing machine in such a manner that when the papers are finally cut into strips, 1¼ inches by 1¾ inches, the preferred size of papers 11 and 12, the stitches will appear on the edge of each strip along the two longer dimensions only. The stitches 14 are black on paper 12 and white on paper 11; the thread in this manner blends into the background of papers 11 and 12. Favorable results may also be obtained when papers 11 and 12 are cemented together along two edges with a water-resistant cement instead of being sewn.

The medium 10 is placed into a vial 17 in a curved position with the black surface on the concave side, the vial 17 having a cap 16 threaded upon the neck 18 thereof and a height slightly greater than the 1¾ inch length of the medium 10. The medium 10 in the vial 17 is saturated with a mixture of nutrient material for fungi. In the preferred embodiment of the present invention the mixture comprises:

| | | |
|---|---|---|
| Peptone | grams | 10 |
| Dextrose | do | 40 |
| Agar | do | 15 |
| Potassium nitrate | do | 1 |
| Sorbitan mono-oleate ("Tween–80") | do | 8 |
| Thiamin (vitamin B₁) | milligrams | 5 |
| Potassium acid phosphate | grams | 1 |
| and | | |
| Water | do | 1000 |

The function of the peptone is to provide the essential amino acids; the function of the dextrose is to act as a precursor to the pigment, if any, that may be produced by the fungus and which thiamin has been shown by several investigators to be necessary; the nitrate provides readily available inorganic nitrogen to supplement the organic nitrogen from the peptone, resulting in a more luxuriant growth; the sorbitan mono-oleate, as a surface-active agent and solubilizing agent, allows the difficultly soluble pigment to diffuse more rapidly from the black paper 12 into the white paper 11; the sorbitan mono-oleate also allows the toxic metabolic intermediates to diffuse away from the mycelial mat of the fungus colony, thus producing an earlier luxuriant growth; the agar functions to bind all the ingredients of the nutrient mixture to the paper medium 10, preventing an uneven distribution of nutrient materials when the complete unit, or medium 10 in vial 17, is permitted to stand in a vertical position for long periods of time; and the phosphate, of extreme importance in the intermediate energy metabolism of all living things, has been added to supplement the phosphates naturally occurring in peptone.

The sorbitan mono-oleate in the above formula may be increased to as high as 50 grams, resulting in an even earlier appearance of pigment for many fungi, among them *T. purpureum*. However, when the present invention is used to identify an unknown fungus, a quantity above 8 grams is not desirable since the growth of other pathogenic fungi and yeasts may be completely or partially inhibited by this high concentration of the surface-active agent.

The present invention is not restricted to the preferred embodiment of the nutrient, as any nutrient which is suitable for the cultivation and identification of fungi may be utilized. The medium 10 may be saturated with "Wort Agar" for the cultivation of yeasts; with "Cornmeal Agar" for the production of chlamydospores by *Monilia albicans*; with "Sabouraud Dextrose Agar" and "Littman Oxgall Agar" for the isolation and identification of dermatophytes; and for any nutrient liquid for the cultivation and identification of pathogenic fungi now in use in the form of an agar slant or broth.

In the preferred embodiment, the peptone, dextrose, agar, and water, are essentially components of a nutrient which is referred to as "Sabouraud Dextrose Agar." The four chemicals, potassium nitrate, sorbitan mono-oleate, thiamin, and potassium acid phosphate, are added to produce an earlier and more luxuriant growth and earlier pigment-production of the fungus.

With the saturated medium 10 in the vial 17 and the cap 16 threaded loosely upon the neck 18, the entire assembly of vial 17 and the contents therein, referred to as a "Myco-Kit" tube, is sterilized in an autoclave at a steam pressure of 15 pounds per square inch for 15 minutes, and the cap 16 tightened upon the neck 18, when cooled, to prevent evaporation on prolonged storage.

The nutrient mixture, as described above, may also be used alone, without the papers and calcium carbonate, in the form of an agar slant. The nutrient mixture, utilized as an agar slant, will produce an earlier profuse growth and will produce pigments earlier when compared to the other mycological culture media now in use.

The "Myco-Kit" tube, or the paper impregnated culture medium 10 in the vial 17, is utilized to determine the existence and thereafter the identification of pathogenic fungi. More particularly, with the preferred medium-soaked nutrient described above, the "Myco-Kit" tube, or medium 10 in vial 17, is utilized to identify the four pathogenic fungi

*Monilia albicans*
*Trichophyton purpureum*
*Trichophyton gypseum*, and
*Epidermophyton inguinale* which are the causative fungi for almost all fungus infections of the foot, or "athletes-foot." To identify the fungus or fungi, if more than one is involved, the exudate or scales from the lesion are transferred to the black paper 12 of the medium 10 which has been inserted in vial 17 with the white paper 11 against the side of the vial 17. The vial 17 is then stored in a dark place at room temperature. The culture colony, if any, begins to grow in a few days and becomes visible almost immediately on the black paper 12. The paper 12, by virtue of its black background, facilitates the detection of the earliest growth which is generally white and cottony in appearance. The pathogenic yeasts are also readily visible, being cream-colored or light brown in appearance.

During the metabolic processes in the growth of many fungi, a pigment is liberated that is characteristic of the fungus. For example, the pigment produced by *T. purpureum* is red to purple and the one produced by *T. gypseum* is yellow to light green. The characteristic pigment of the fungus diffuses through the calcium carbonate layer 13, which intensifies the color thereof, into the white paper 11. This diffusion is enhanced by the presence of the sorbitan mono-oleate in the preferred embodiment, as has been mentioned above. The calcium carbonate layer 13 is a compound having basic properties and therefore combines chemically with the liberated pigment which is acidic in nature to form a salt. Most of the pigments produced by fungi during their metabolic processes are chemical pH indicators, having one color in an alkaline medium and another color in an acid medium. The pigment produced by *T. purpureum*, for example, is yellow in an acid medium and red to purple in an alkaline medium. In diffusing through the insoluble layer 13, the pigment of *T. purpureum* combines with the calcium carbonate to produce a calcium salt that is basic in reaction. The initial color of the pigment was yellow when it was first formed in the mycelial mat of the colony and this yellow color is converted almost immediately to a more intense red color as a result of the action of the calcium carbonate. In the "Sabouraud Dextrose Agar" the red pigment appears only because the *T. purpureum*, in addition to producing a yellow pigment in the nutrient material that is acid in reaction, also liberates other metabolic intermediates and waste products which slowly convert the nutrient material from its initial acid reaction to an alkaline solution, thereby converting the yellow pigment initially produced to a final red to purple color.

Three of the four fungi listed above provide for different color indications upon paper 11, as follows:

*T. purpureum*—red to purple
*T. gypseum*—yellow to yellow-green
*E. inguinale*—yellow-tan to green, the colony itself also assuming the same colors, while *Monilia albicans* appears as a cream-colored pasty colony on the black paper 12.

The present invention, as described above, will result in the appearance of characteristic colonies and characteristic pigments in less than ⅔ the time required on "Sabouraud Dextrose Agar." This may be concluded on examination of the Comparison Table below:

*Comparison of growth and of pigment-production of the fungi responsible dermatophytosis of the feet*

[Average days]

| Organism | Earliest Perceptible Appearance of Growth | | Earliest Appearance of a Sizeable Characteristic Colony | | Earliest Appearance of a Characteristic Pigment | |
|---|---|---|---|---|---|---|
| | "Sabouraud Agar" | Present invention | "Sabouraud Agar" | Present invention | "Sabouraud Agar" | Present invention |
| *T. purpureum* | 5 | 3 | 8 | 6 | 12 | 7 |
| *T. gypseum* | 4 | 3 | 6 | 4 | 12 | 4 |
| *E. inguinale* | 6 | 3 | 8 | 6 | 15 | 8 |
| *M. albicans* | 2 | 2 | 4 | 4 | | |

For example, the earliest perceptible appearance of growth of *T. purpureum* with "Sabouraud Dextrose Agar" is about 5 days and with the improved method it is two days less; the earliest appearance of pigment *T. purpureum* with "Sabouraud Dextrose Agar" is about 12 days as compared to a week with the improved method. The medium 10, in the manner described above, thus produces an earlier noticeable growth on the black paper 12 and earlier and more clearly defined pigments on the white paper 11. The medium 10 lasts for a relatively long period of time since shrinkage, which is a problem with solidified agar media, does not occur.

The present invention, as described, need not be restricted to fungus infections of the feet, the dermatophytes. Any mycotic infection, no matter where the site, that has previously been dagnosed with the aid of agar slants or plates in the form of the above-mentioned "Sabouraud Dextrose Agar," "Littman Oxgall Agar," and for that matter any agar or broth used for the cultivation of fungi and the identification of fungi, may now be diagnosed more readily, more effectively, and more conveniently by means of the present invention, as described.

During the inoculation of the medium, contamination by bacteria and by non-pathogenic yeasts and molds may occur. The growth of the contaminating bacteria is arrested by the low acidity of the preferred embodiment, the presence of the sorbitan mono-oleate, and the porous surface of the black paper 12. The non-pathogenic yeasts and molds do not generally spread over the entire surface of the black paper 12 and therefore do not obscure the growth of the pathogenic colony. The contaminant molds remain localized due to the porous nature of the black paper 12 and partly due to the presence of the sorbitan mono-oleate in the preferred embodiment.

The medium 10 may be dried in a desiccator after removing cap 16, and kept in this dehydrated form for indefinite periods of time. Before the inoculation of medium 10 is performed, a premeasured quantity of sterile water is added to the vial 17. The water is absorbed by the medium 10 and a homogeneous gel is once again formed within the pores of papers 11 and 12. This simple process of preparing a mycological culture medium from its dehydrated form can only be accomplished when all the solids have previously been absorbed by the porous papers. With the medium 10 the dried material readily goes into solution without heating and without subsequent sterilization which is a great convenience in a small laboratory, the office, and in the field where autoclaves are not readily available.

It is to be understood that the above-described arrangements are illustrative of the application of the principles of this invention. Numerous other arrangements may be devised by those skilled in the art without departing from the spirit and scope of the invention. For example, the following are some other arrangements and purposes:

1. In studying the pigments produced by fungi, the white paper 11 containing the pigment may be conveniently separated from the black paper 12 in order to simplify the extraction of the pigment. The calcium carbonate layer 13 may be omitted for these studies and large discs of filter paper may be employed and placed in Erlenmeyer or Kolle flasks. Various reagents may also conveniently be dropped on the white paper 11, containing the pigment, for spot tests without previous extraction of the pigment.

2. Other insoluble material may be substituted for the carbonate layer 13 for other desired chemical combinations and color reactions.

3. The medium 10 may be transferred to the stage of a microscope, at any stage of development of the fungus colony, for close microscopic examination with reflected light without disturbing the mycelia of the colony. This is of considerable importance in morphologic studies for purposes of identification and as a general teaching aid.

4. This invention may be utilized in the preparation of preserved specimens of the various fungi for record and teaching purposes. After the fungus colony has reached a desired size and color, the cap 16 is removed and the vial is placed in a desiccator for several days. The contents of the vial 17 are then exposed to the fumes of formalin for several hours and the cap 16 is replaced. The aerial mycelia seem to retain their forms almost indefinitely and the pigment, if any, on the reverse side remains bright and intense. The yeast cultures are best preserved by adding several drops of formalin to the vial 17 and keeping the contents moist by sealing the cap 16.

5. The paper 12 may be any very dark shade of gray, green, blue or brown and the paper 11 may be light in color in accordance with the usual definitions of "black" and "white."

Numerous further arrangements may be devised by those skilled in the art without departing from the spirit and scope of the invention.

What is claimed is:

1. A medium for the growth and identification of fungi comprising a thin porous material impregnated with a nutrient material, said porous material having a black surface and a white surface in the form of porous paper connected together.

2. A mycological medium in accordance with claim 1 comprising in addition a layer of calcium carbonate sandwiched between said black and said white papers to combine with the pigments liberated during the growth of the fungi and produce an intense color characteristic of the fungus.

3. A medium for the identification of pathogenic fungi comprising a nutrient for the growth of pathogenic fungi, two porous bodies for supporting said nutrient, and a thin carbonate layer between said two porous bodies, one of said porous bodies being light in color and the other of said porous bodies being dark in color.

4. A medium in accordance with claim 3 wherein said nutrient comprises potassium nitrate, potassium acid phosphate, sorbitan mono-oleate, and thiamin, having a total weight of approximately 1% of said nutrient, for enhancing the growth and pigment-production of fungi.

5. A medium for the identification of pathogenic fungi having potassium nitrate, potassium acid phosphate, sorbitan mono-oleate, and thiamin, having a combined weight of approximately 1% of said nutrient, for accelerating the growth and pigment-production of the fungus; a black and white porous paper for supporting said nutrient; and a layer of calcium carbonate between said black and white papers for intensifying the color of the pigment produced by the fungus.

6. A culture medium for the growing and identification of fungi comprising a black porous filter paper which, by virtue of its jet-black color, causes the earliest possible appearance of the fungus colony to become perceptible immediately; a white porous filter paper adjacent said black paper and upon which the pigment produced by the fungus immediately becomes perceptible; and a nutrient material impregnating said black and said white papers.

7. A dehydrated culture medium for use when sterile water is added for the growth and identification of fungi comprising a porous material having a white and a black section; a layer of calcium carbonate sandwiched between said black and said white sections to intensify the characteristic indications of the various fungi; and a dehydrated culture mixture impregnating said black and said white sections.

8. A dehydrated culture medium in accordance with claim 7 wherein said mixture before dehydration comprises the following components and ratios by weight: peptone 10, dextrose 40, agar 15, sorbitan mono-oleate 8, potassium nitrate 1, potassium acid phosphate 1, thiamin 0.005, and water 1000.

9. A method of preparing a dehydrated mycological diagnostic culture medium comprising the steps of dyeing black a large sheet of filter paper, coating said dyed sheet with a calcium carbonate suspension, allowing said dyed and coated sheet to dry, placing an undyed sheet of filter paper on the coated surface of said dyed and coated sheet to form a sandwich, affixing said dyed and undyed sheets, cutting said affixed sheets into selected dimension sections, inserting a section into a sealable vial, saturating said section with a mixture of nutrient material, sterilizing said vial and said saturated section, cooling said sterilized vial and said sterilized section, dehydrating said sterilized section under aseptic conditions, and sealing said dehydrated section in said vial.

10. A method of preparing a mycological diagnostic culture paper medium comprising the steps of dyeing black a large sheet of filter paper, coating said dyed sheet with a calcium carbonate suspension, allowing said dyed and coated sheets to dry, placing an undyed sheet of filter paper on the coated surface of said dyed and coated sheet to form a sandwich, affixing said dyed and undyed sheets, cutting said affixed sheets into selected dimension sections, inserting a section into a sealable vial, saturating said section with a mixture of nutrient material, sterilizing said vial and said saturated section, cooling said sterilized vial and said sterilized section, and sealing said cooled vial to prevent evaporation.

11. A medium for the growth and identification of fungi comprising a porous material impregnated with a nutrient material, and a thin carbonate layer on said porous material which layer combines with the pigments liberated during the growth of the fungus and produces an intense color characteristic of the fungus, said porous material having a dark surface and a light surface to facilitate the identification of the fungus.

References Cited in the file of this patent

UNITED STATES PATENTS 2,677,646   Lovell _____ May 4, 1954

OTHER REFERENCES

Holman et al.: Jour. Bact., 8, 1923, pages 581–582.
McCartney: Lancet, Aug. 10, 1933, page 425.
Smith: Industrial Mycology, 2 ed., 1942, Edw. Arnold & Co., Ltd., London, page 177.
Federal Register, Apr. 4, 1947, page 2217.
Valentine et al.: Lancet, Dec. 3, 1949, pages 1033, 1934.
Severens Bacteriological Proceedings, S. A. B., 1950, page 65.